(12) United States Patent
Chapman et al.

(10) Patent No.: US 10,112,484 B2
(45) Date of Patent: Oct. 30, 2018

(54) THROTTLE PEDAL

(71) Applicant: ORSCHELN PRODUCTS L.L.C., Moberly, MO (US)

(72) Inventors: Alan Chapman, Madison, MO (US); Michael Lindsay, Columbia, MO (US); Jeffrey Pendleton, Moberly, MO (US); Matthew Nevels, Columbia, MO (US); Wayne Lawrence Soucie, Columbia, MO (US)

(73) Assignee: Orscheln Products L.L.C., Moberly, MO (US)

( * ) Notice: Subject to any disclaimer, the term of this patent is extended or adjusted under 35 U.S.C. 154(b) by 0 days.

(21) Appl. No.: 15/321,582

(22) PCT Filed: Jul. 28, 2015

(86) PCT No.: PCT/US2015/042466
§ 371 (c)(1),
(2) Date: Dec. 22, 2016

(87) PCT Pub. No.: WO2016/018907
PCT Pub. Date: Feb. 4, 2016

(65) Prior Publication Data
US 2017/0210227 A1    Jul. 27, 2017

Related U.S. Application Data

(60) Provisional application No. 62/030,923, filed on Jul. 30, 2014.

(51) Int. Cl.
*B60K 26/02*    (2006.01)
*G05G 1/44*    (2008.04)
(Continued)

(52) U.S. Cl.
CPC ............. *B60K 26/02* (2013.01); *G01D 5/145* (2013.01); *G05G 1/44* (2013.01); *G05G 25/00* (2013.01);
(Continued)

(58) Field of Classification Search
CPC .......... B60K 26/02; G01D 5/145; G05G 1/44; G05G 1/30; G05G 25/00; G05G 25/04
See application file for complete search history.

(56) References Cited

U.S. PATENT DOCUMENTS 5,385,068 A    1/1995    White et al.
5,768,946 A    6/1998    Fromer et al.
(Continued)

FOREIGN PATENT DOCUMENTS

DE    102010020314 A1 *    11/2011    ............. B60K 26/02
EP    1211586 A1    5/2002
(Continued)

OTHER PUBLICATIONS

International Search Report dated Oct. 28, 2015 in corresponding Appln. No. PCT/US2015/42466.
(Continued)

*Primary Examiner* — Thomas C Diaz
(74) *Attorney, Agent, or Firm* — Sandberg Phoenix & von Gontard P.C.

(57) ABSTRACT

A throttle pedal assembly comprises a housing having a first and second side, top, bottom, front and back walls; a main chamber open to the front and bottom of the housing and a sensor cavity. A pedal assembly comprises a pedal, a pedal arm, and a head at an end of the pedal arm rotatable a pivot axis. A magnet is operatively connected to the pedal assembly to rotate on the pivot axis as the pedal assembly rotates about the pivot axis. A Hall effect sensor assembly mounted in the sensor cavity to be proximate the magnet yet separated (Continued)

from the magnet. The cavity and Hall effect sensor assembly are respectively shaped and sized such that the Hall chip and the magnet lay on a common axis such that the Hall chip and the magnet are coaxially aligned. The sensor cavity is sealed to prevent contaminants from entering the cavity.

8 Claims, 8 Drawing Sheets

(51) Int. Cl.
*G01D 5/14* (2006.01)
*G05G 25/00* (2006.01)
*G05G 25/04* (2006.01)
*G05G 5/05* (2006.01)

(52) U.S. Cl.
CPC ............... *G05G 25/04* (2013.01); *G05G 5/05* (2013.01); *G05G 2505/00* (2013.01); *G05G 2700/12* (2013.01)

(56) References Cited

U.S. PATENT DOCUMENTS

| | | |
|---|---|---|
| 6,330,838 B1 | 12/2001 | Kalsi |
| 6,396,259 B1 | 5/2002 | Washeleski et al. |
| 6,412,364 B1 | 7/2002 | Berglar |
| 6,426,619 B1 | 7/2002 | Pfaffenberger et al. |
| 6,809,512 B2 | 10/2004 | Pfaffenberger et al. |
| 7,219,562 B2 | 5/2007 | Keane |
| 7,503,236 B2 | 3/2009 | Schlabach |
| 7,926,384 B2 | 4/2011 | Wurn |
| 8,042,430 B2 | 10/2011 | Campbell |
| 8,240,230 B2 | 8/2012 | Peniston et al. |
| 8,884,612 B2 | 11/2014 | Hofmockel et al. |
| 2002/0152831 A1 | 10/2002 | Sakamoto et al. |
| 2006/0053957 A1 | 3/2006 | Ewel et al. |
| 2006/0185468 A1 | 8/2006 | Richardson et al. |
| 2008/0184843 A1 | 8/2008 | Klotzbuecher et al. |
| 2008/0218158 A1* | 9/2008 | Carlson ............... G01D 5/145 324/207.2 |
| 2010/0077886 A1 | 4/2010 | Seiltz et al. |
| 2010/0206122 A1 | 8/2010 | Seiltz |
| 2011/0100153 A1 | 5/2011 | Kaijala et al. |

FOREIGN PATENT DOCUMENTS

| | | |
|---|---|---|
| JP | 2013117477 A2 | 6/2013 |
| WO | 2014084791 A1 | 6/2014 |

OTHER PUBLICATIONS

Written Opinion dated Oct. 28, 2015 in corresponding Appln. No. PCT/US2015/42466.

* cited by examiner

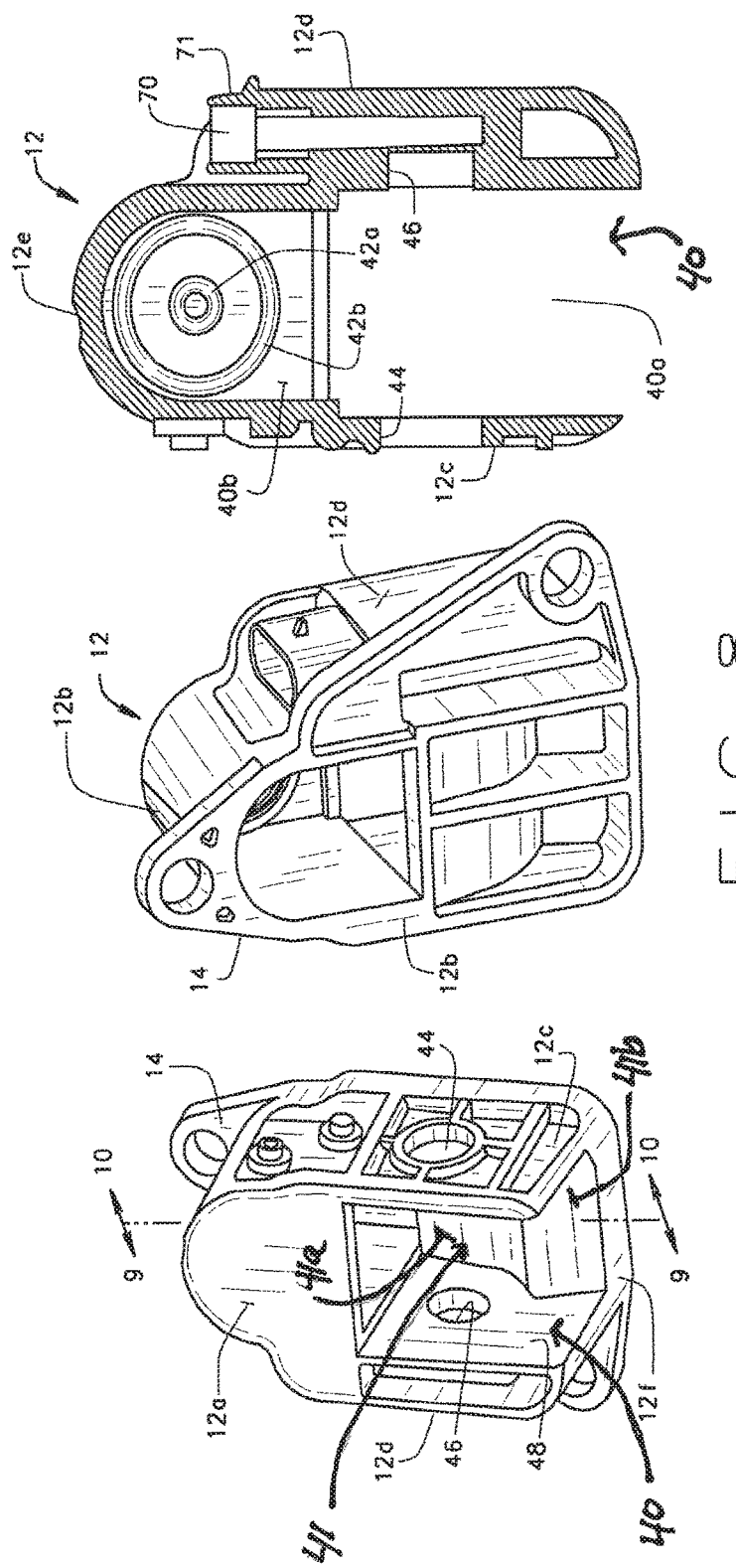

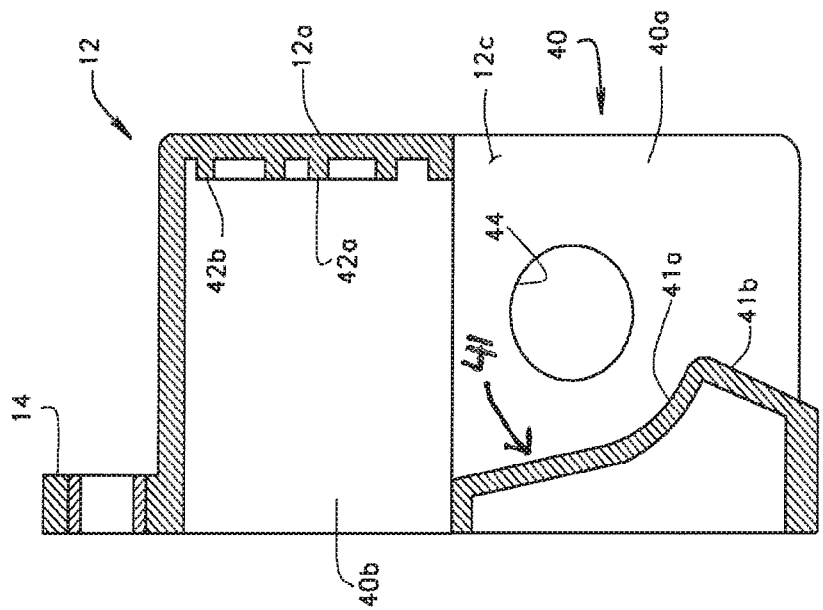
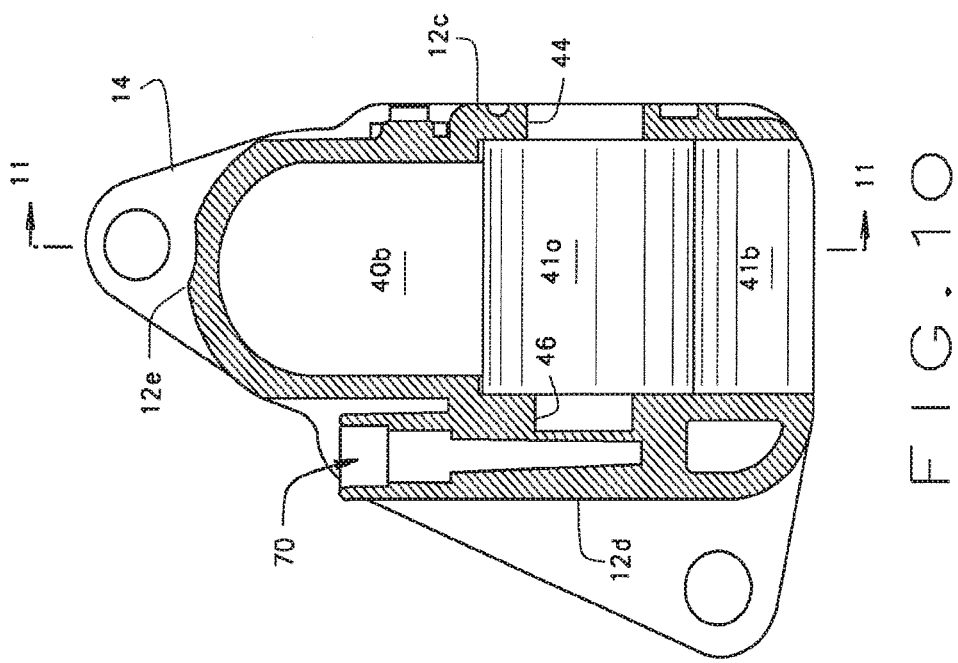

THROTTLE PEDAL

RELATED APPLICATIONS

This application is the US National Stage of International Application PCT/US2015/042466 which was filed Jul. 28, 2015 (which was published as WO2016/018907) and which claims priority to U.S. Pat. App. No. 62/030,923 which was filed on Jul. 30, 2014 and which is incorporated herein by reference.

STATEMENT REGARDING FEDERALLY SPONSORED RESEARCH OR DEVELOPMENT

Not Applicable.

BACKGROUND OF THE INVENTION

This application relates to throttle pedals, for example, for use with vehicles, and in particular to an improved throttle pedal that utilizes non-contact Hall effect technology.

Hall effect sensors have been used in throttle pedals. However, such existing pedals have numerous parts, making them expensive and difficult to assemble. Further, during manufacture, these numerous parts can affect the correlation between the device rotation and the sensor output.

BRIEF SUMMARY OF THE INVENTION

The throttle pedal disclosed has fewer moving parts relative to existing throttle pedals. This reduces the number of components required by the throttle device, thus making assembly of the throttle pedal easier. Additionally, it facilitates a closer correlation between device rotation and sensor output. This will provide for a more accurate indication of the position of the throttle pedal.

BRIEF DESCRIPTION OF THE SEVERAL VIEWS OF THE DRAWINGS

FIGS. 7 and 8 are front and back perspective views, respectively of the housing for the throttle pedal assembly;

FIGS. 9 and 10 are cross-sectional views of the housing taken along lines 9-9 and 10-10, respectively, of FIG. 7; and FIG. 11 is a cross-sectional view of the housing taken along line 11-11 of FIG. 10.

Corresponding reference numerals will be used throughout the several figures of the drawings.

DETAILED DESCRIPTION OF THE INVENTION

Figure 1:
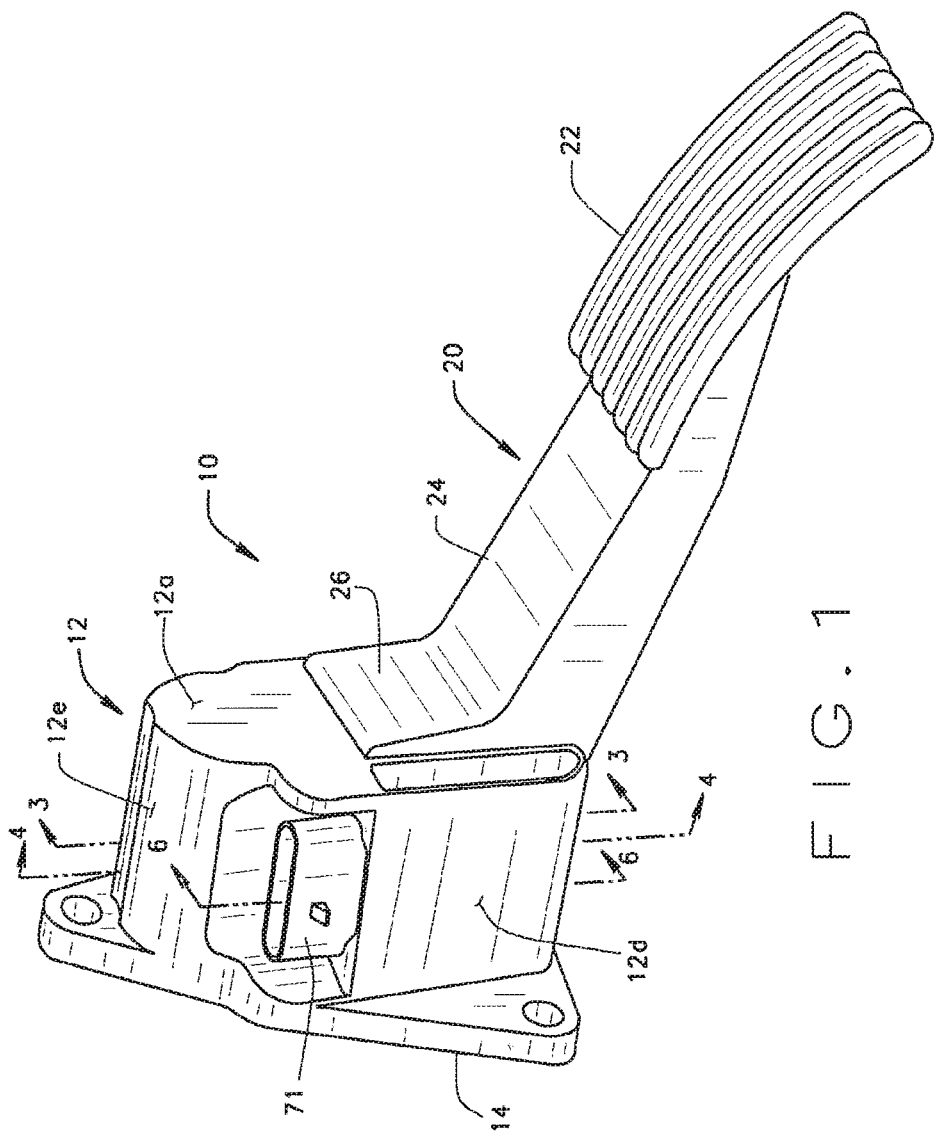
FIG. 1 is a perspective view of the disclosed throttle pedal assembly.

The following detailed description illustrates the invention by way of example and not by way of limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2:
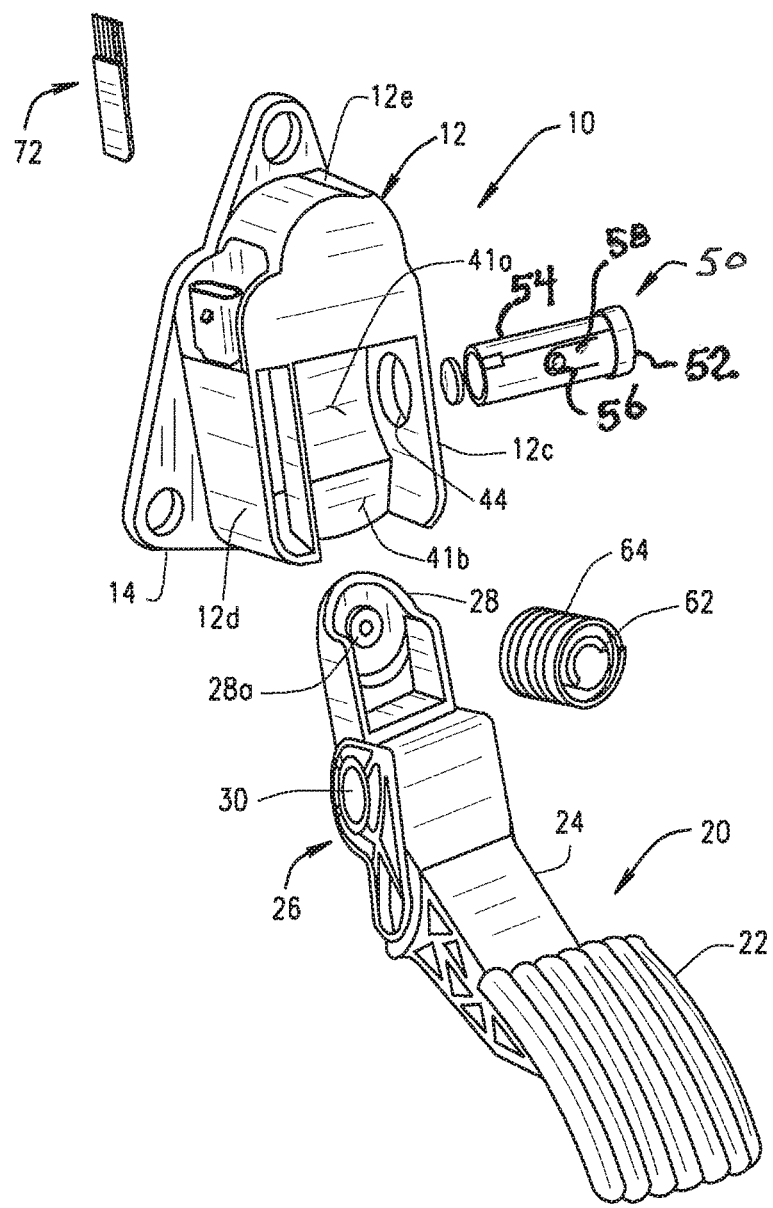
FIG. 2 is an exploded perspective view of the throttle pedal assembly.

A throttle pedal assembly 10 is shown generally in FIG. 1 and in an exploded view in FIG. 2. The throttle pedal assembly 10 comprises a housing 12 having a front wall 12a, a rear wall 12b, a right side wall 12c, a left side wall 12d, a top 12e and a bottom 12f. A mounting plate or support bracket assembly 14 for mounting the throttle pedal assembly 10 in a vehicle extends from the edges of the rear surface 12b, and, as seen, is effectively a continuation of the rear surface 12b of the housing. The manner of mounting the throttle pedal assembly is well known to those of ordinary skill in the art, and will not be described. The throttle pedal assembly, for example, may be affixed to an adaptor plate to facilitate mounting with various vehicle configurations.

Figure 3:
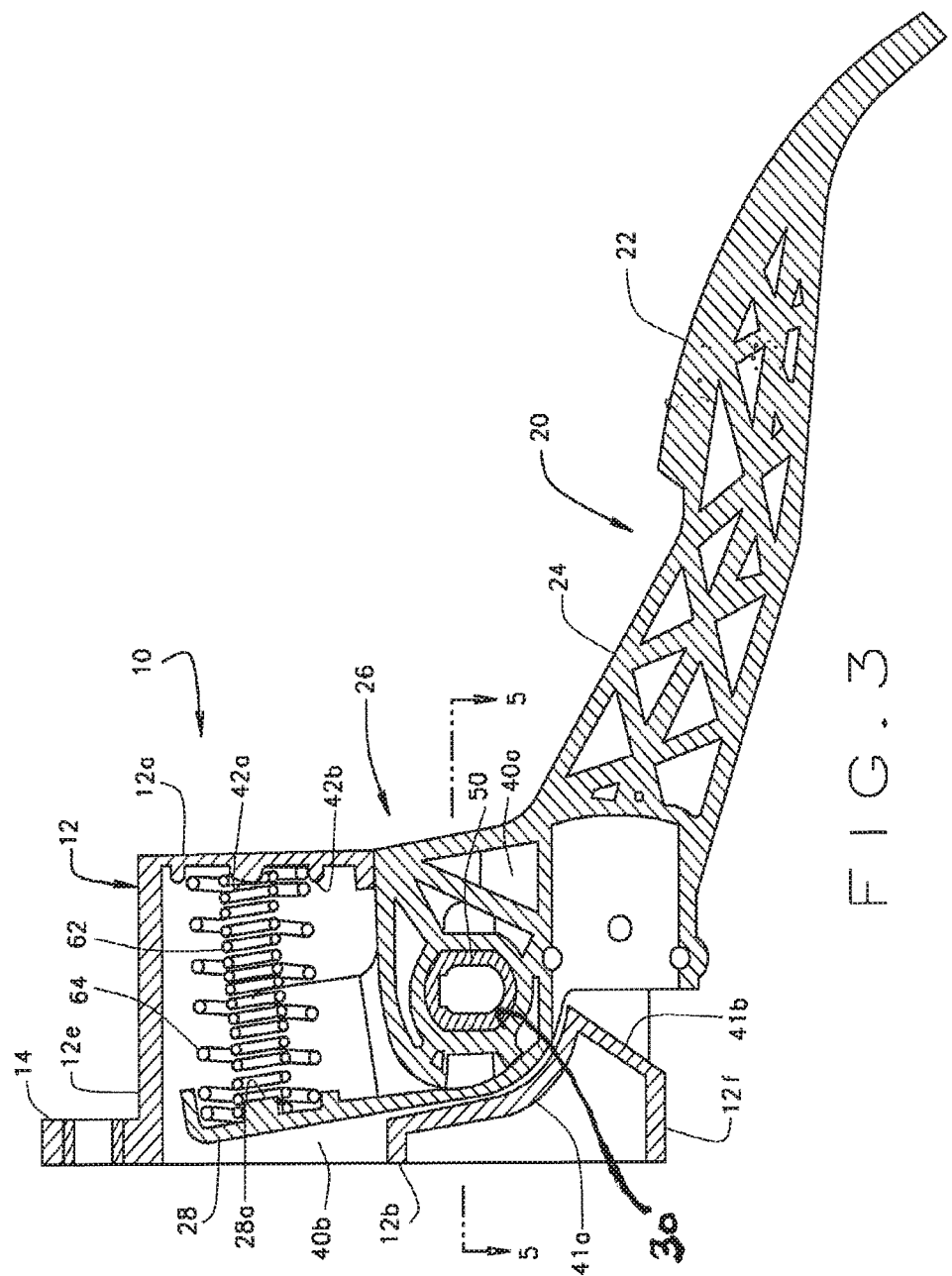
FIG. 3 is a vertical cross-section of the throttle pedal assembly taken along line 3-3 of FIG. 1.
Figure 4:
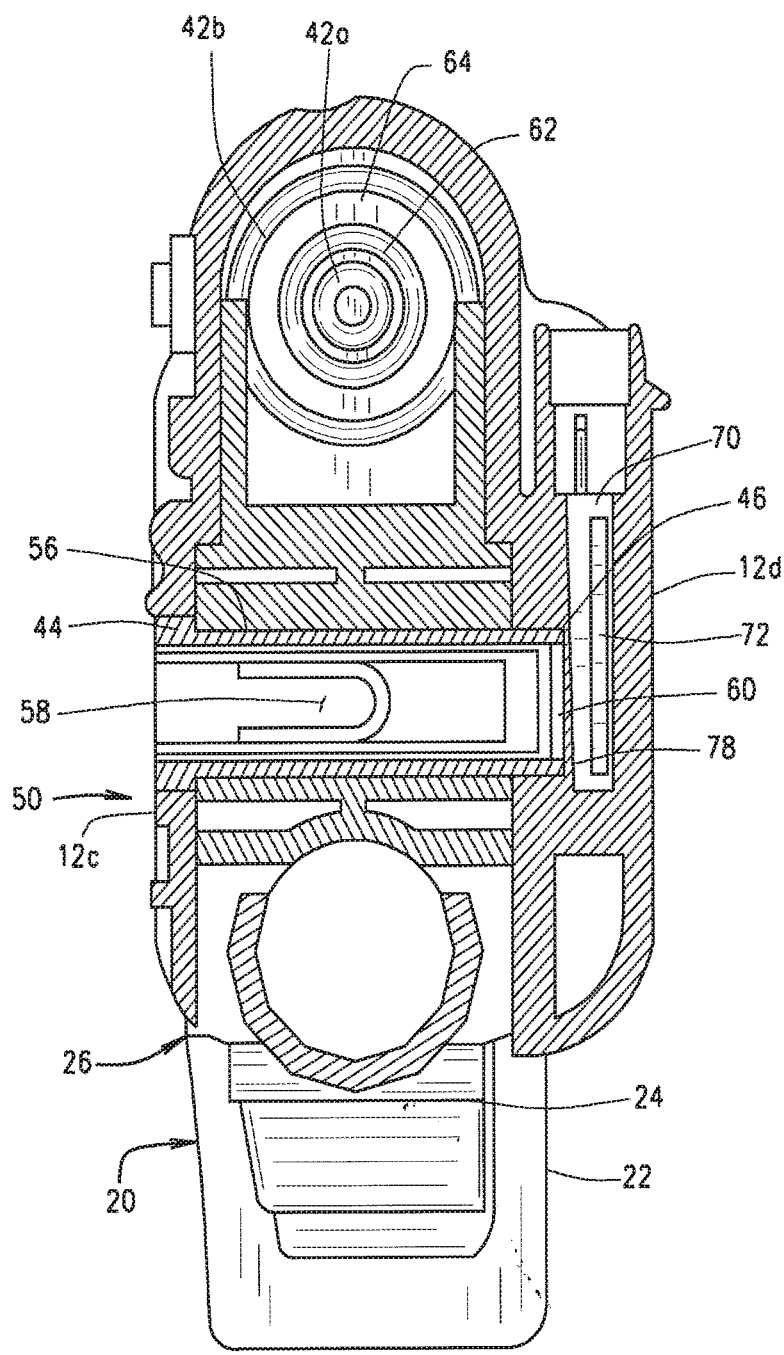
FIG. 4 is a vertical cross-section of the throttle pedal assembly at 90° relative to FIG. 3, and taken along line 4-4 of FIG. 1.

A pedal assembly 20 is pivotally mounted to the housing 12. The pedal assembly 20 comprises a pedal 22 and a pedal arm 24 extending rearwardly from the pedal 22. The pedal arm 24 ends in a head 26 that is remote from the pedal 22. A spring bracket 28 extends upwardly from the pivot head 26 and includes a spring positioning button 28a. The pedal assembly head 26 includes a passage 30 that extends the side-to-side width of the head 26. The passage 30, as seen in FIG. 3, has generally straight or flat sidewalls joined by arced top and bottom walls, making the passage more or less of an elongated circle in cross-section. The passage 30 could be other shapes, such as polygonal, if desired. The passage 30 has at least one opening or depression 32, and preferably two opposed openings or depressions, formed in the wall of the passage 30. The openings 32 can be formed as a bore which extends from an outer surface of the head 26, and which passes through and slightly beyond, the passage 30.

The housing 12 defines a chamber 40 which receives the head 26 of the pedal assembly 20. The chamber 40 includes a lower portion 40a which opens to the front wall 12a and bottom 12f of the housing 12 and an upper portion 40b which opens to the back wall 12b of the housing. The housing lower portion 40a includes a back wall 41 comprising an upper curved portion 41a and a lower, more straight portion 41b which angles back slightly. The back wall 41 is below the opening of the chamber upper portion 40 to the back wall of the housing. As seen in FIG. 3, the back surface of the pedal assembly head 26 rides along the back wall upper surface 41a. The chamber upper portion 40b includes an inner spring positioning member 42a and an outer spring positioning member 42b which are on the inner surface of the front wall 12a. The housing 12 further includes an opening 44 in the right side wall 12c and a closed bore 46 in a left wall 48 of the chamber. The closed bore 46 is aligned with the right wall opening 44.

Figure 5:
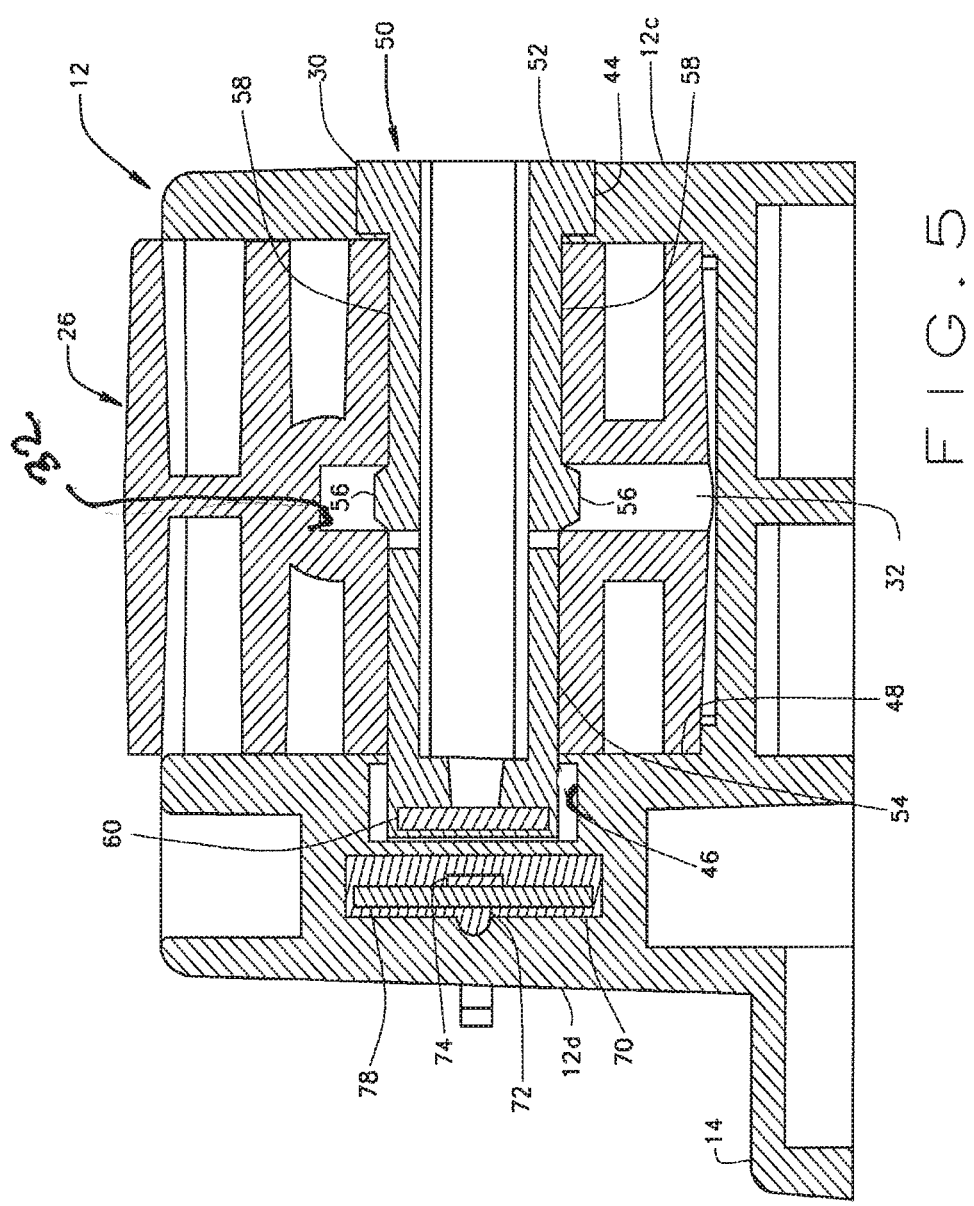
FIG. 5 is a horizontal cross-sectional view of the throttle pedal assembly taken along line 5-5 of FIG. 3

The pedal assembly 20 is mounted in the housing chamber 40 by means of a magnet carrier 50 to pivot between a normal raised position and a lowered pressed position, as seen in FIG. 1. The magnet carrier 50 includes a generally circular head 52 which is received in the housing right wall opening 44 and a body 54 which extends through the passage 30 of the pedal assembly head 26 into the closed bore 46 in the chamber wall 48. The circular head 52 of the carrier 50 rides in the opening 44 (which is preferably circular) of the housing right side wall 12b to allow the carrier to rotate relative to the housing. Preferably, the opening 44 is countersunk, as shown in FIG. 5, such that the outer surface of the carrier head is generally flush with the outer surface of the housing 12. The body 54 of the magnet carrier is shaped generally complimentarily to the pedal assembly head passage 30. Hence, as best seen in FIG. 3, the magnet carrier body has a generally flat side wall. The corresponding shapes (flattened elongated circles) of the magnet carrier body 54 and the pedal head passage 30 rotationally fix the carrier 50 relative to the pedal head 26. Thus, the magnet carrier 50 defines a shaft or pivot axle for the pedal assembly 20. Movement of the pedal arm (such as by a driver stepping on or removing pressure from the pedal) translates to rotational motion of the magnet carrier.

The magnet carrier 50 is also axially fixed to the pedal assembly head 26 to prevent axial movement of the magnet carrier relative to the pedal assembly head 26. Because the pedal assembly head is generally axially fixed in the housing by the chamber 40, the carrier is also axially fixed relative to the housing 12. To axially fix the carrier 50 to the pedal assembly head 26, the carrier includes opposed projections or nubs 56 which extend radially outwardly from the magnet carrier body 54. The nubs 56 are sized and positioned to be received in the openings 32 in the head passage 30. The nubs 56 engage the openings 32 to axially fix the position of the carrier to the pedal assembly head 26. The nubs further rotationally fix the carrier 50 to the pedal assembly head 26. The magnet carrier body (or shaft) 54 is preferably hollow, and the nubs 56 are formed on flexible or bendable arms 58 which can deflect inwardly. Thus, the pedal is rotationally mounted in the housing chamber 40 by first positioning the pedal assembly head 26 in the chamber 40 with the head bore 30 aligned with the right wall opening 44 and the closed hole 46 in the housing. The carrier 50 is then inserted through the right wall opening 44 and the head bore 30 until the nubs 56 engage the head bore openings 32. As can be appreciated, the carrier arms 56 deflect inwardly to allow the carrier body 54 to pass through the pedal assembly head bore 30. When the nubs 56 are aligned with bore openings 32, the carrier arms snap back to their normal position. At that point, the carrier snaps into engagement with the pedal head. This snap connection allows for assembly of pedal assembly 20 to the housing 12 to be accomplished without the use of tools.

An inner spring 62 and an outer spring 64 are positioned in the housing chamber upper portion 40b. The two springs are coaxial with each other, and extend between the spring positioning members 42a,b on the chamber front wall and the spring positioning button 28a in the spring bracket 28 of the pedal assembly. The springs 62, 64 are, for example, torsion springs, which return the pedal to the normal, raised, position after the pedal has been released from the pressed position (i.e., after a driver lifts his or her foot off the pedal). Although two springs are shown, it will be appreciated that a single spring could be used if desired. Alternatively, a different biasing or spring material could be used which would return the pedal to its raised position after being released from a pressed position. The housing chamber 40 and the pedal assembly head 26 are sized and shaped such that the pedal can move along an arc of between about 15° to about 25°, and preferably between about 18° to about 22°.

As best seen in FIG. 5, the carrier 50 has a magnet 60 mounted in the end of the magnet carrier body 54 opposite the carrier head 52. The magnet carrier body 54 is sized such that the magnet 60 is proximate the inner surface of the closed bore 46. Because the magnet 60 is mounted to the shaft 54, the magnet 60 will rotate with the shaft as the pedal 22 is depressed. In a preferred embodiment, the magnet is molded into the magnet carrier body (which is made from a plastic). Alternatively, the magnet 60 can be glued or snapped into a depression formed at the end of the magnet carrier body.

Figure 6:
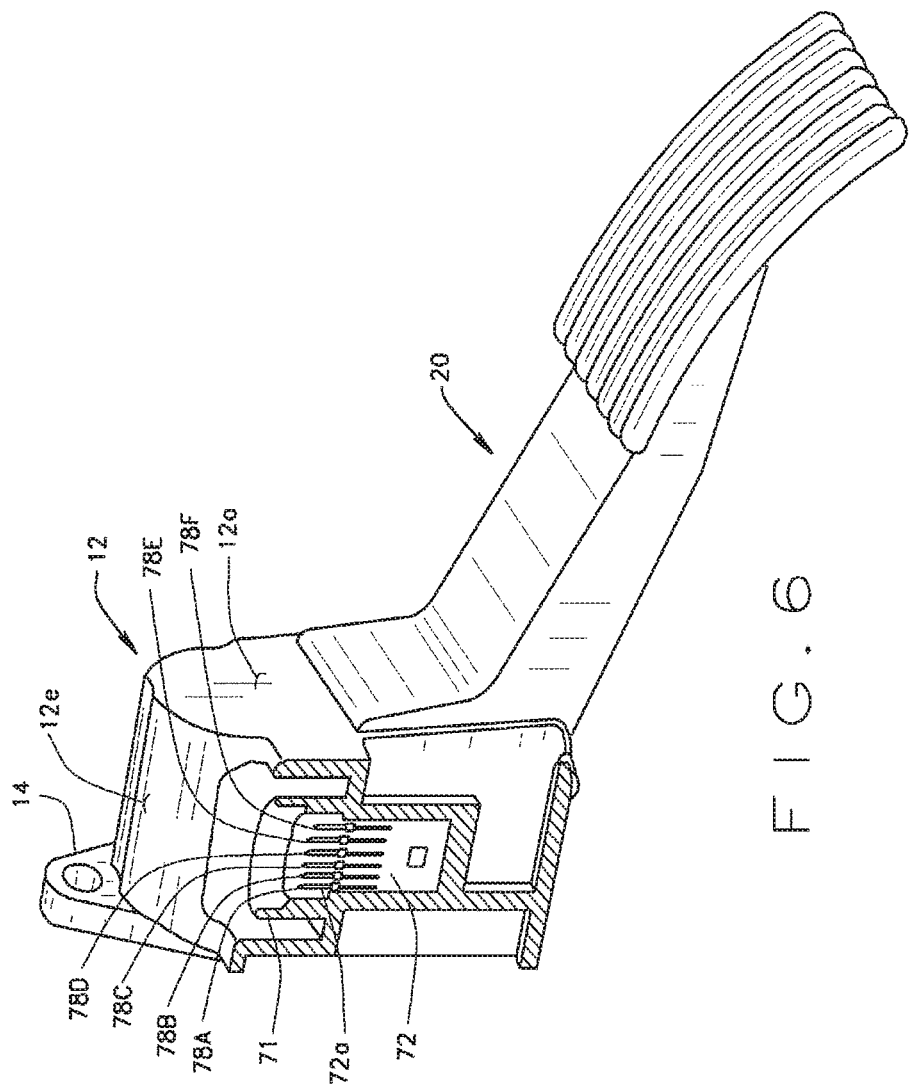
FIG. 6 is a vertical cross-sectional view through the PC Board housing of the throttle pedal assembly, taken along line 6-6 of FIG. 1.

A sensor cavity 70 is formed in the left surface 12d of the housing. The cavity 70 opens to the top surface 12e of the housing. The housing includes a sleeve 71 extending upwardly from the top of the cavity 70. A Hall effect sensor assembly or PC board 72 having a Hall chip 74 is received in the cavity 70. As seen in FIG. 6, the closed bore 46 in the housing chamber 40 extends toward the sensor cavity 70, but is separated from the sensor cavity by the end wall of the bore 46. When mounted in the sensor cavity, the Hall chip 74 is located opposite, and in alignment with, the magnet 60, and the two are separated only by the thin end wall of the closed bore 46. Further, the cavity 70 is sized and positioned such that when the Hall effect sensor assembly 72 and the pedal assembly 20 are mounted in the housing, the Hall chip 74 and the magnet 60 will be on the same axis. That is, the Hall chip 74 and magnet 60 will be coaxial.

The PC board 72 and the Hall effect chip 74 are encased in resin 78. In a preferred method, the PC board with the Hall effect chip are first encapsulated in the resin, and then then the encapsulated PC board with the Hall effect chip is secured in the sensor cavity 70, such as by heat staking the assembly in the cavity 70. Alternatively, the resin could be molded around the PC board and the sensor cavity 70 could be shaped to enable the hall effect sensor assembly (encapsulated PC board with Hall effect sensor) to be snap fitted into the cavity. As a further alternative, the sensor assembly 72 can be positioned in the sensor cavity 70, and then the sensor cavity can be filled with the resin 78 to surround and encapsulate the sensor assembly. The resin can be any settable resin which is not electrically conductive. The resin seals the sensor assembly and totally isolates the sensor assembly 72 from the environment, thereby preventing dirt, dust, water, etc. from contacting the sensor assembly 72. Thus, dirt, dust, water, etc. cannot interfere or compromise the sensor signals.

The sensor housing includes a connector sleeve 71, as noted, which extends upwardly from the housing top 12e. The sensor assembly include pins 78A-F which extend up from the PC board into the sleeve 71. The sleeve 71, however, extends above the ends of the pins 78A-F. The sleeve 71 is sized to accept a connector body which can connect to the pins 78A-F. As is known, the connector body will connect the sensor assembly 72 to a controller by means of a wire (such as a ribbon wire).

An illustrative pin layout is as follows:

| Pin | Function |
| --- | --- |
| 78A | APSI-Signal |
| 78B | APSI-Return/Ground |
| 78C | APSI-Supply |
| 78D | APSI-Supply |
| 78E | APSI-Return/Ground |
| 78F | APSI-Signal |

However, it will be appreciated that other pin layout configurations can be used. Further, more or fewer pins can be used, as may be dictated by either the controller or the sensor assembly board.

In the throttle pedal assembly 10, the magnet 60 and the Hall chip 74 are positioned on the same axis; the magnet 60 is an integral part of the magnet carrier 50 which defines the pivot axis for the pedal assembly 20; and because the hall chip 74 is encapsulated by the resin, it is an integral part of the housing 12. This design gives the throttle pedal assembly significant advantages. First of all, as noted above, the design of the carrier 50 makes assembly of the throttle pedal assembly simple, and allows for production of the throttle pedal assembly to be accomplished without the use of tools. Further, because the magnet 60 is fixed to (or embedded in) the carrier 50, rather than being fixed to the housing, there are no moving components in the sensor cavity 70. Thus, the sensor cavity 70 can effectively be filled with the sealant 78 (that is, the sealant 78 can occupy the space defined by the sensor cavity 70) to ensure against ingress of water and/or dust which can affect the functioning of the Hall chip assembly 72.

As can be appreciated, the throttle pedal assembly 10 is produced from a minimal number of parts and is easy to manufacture. To manufacture the throttle pedal assembly, the sensor assembly is fixed in the sensor cavity 70 of the housing 12. The head 26 of the pedal assembly 20 is inserted into the chamber 40 of the housing 12. With the pedal assembly head passage 30 aligned with the housing openings 44 and 46, the magnet carrier 50 is inserted through the housing opening 44, the pedal assembly passage 30, and into the blind bore 46. When the magnet carrier is inserted into the bore 30, the magnet carrier's arms 58 flex inwardly. When the carrier body nubs 56 engage the passages 32 in the pedal assembly head, the arms pop back out, and the nubs 56 are urged into the pedal assembly head bores 32 to lock the magnet carrier to the pedal assembly 20. As best seen in FIG. 5, a portion of the housing wall 12c will be between the pedal assembly head 26 and the magnet carrier head 52. Thus, the interconnection of the magnet carrier to the pedal assembly, and the portion of the housing between pedal assembly head 26 and the magnet carrier head 52 will prevent the pedal assembly 20 from separating from the housing. Thus, the snap connection of the magnet carrier to the pedal assembly also connects the pedal assembly to the housing.

To further facilitate manufacturing of the throttle pedal assembly 10, the main components, i.e., the housing 12, the pedal assembly 20, and the magnet carrier 50 can all be made (for example, by molding) from an appropriate plastic.

As various changes could be made in the above constructions without departing from the scope of the invention, it is intended that all matter contained in the above description or shown in the accompanying drawings shall be interpreted as illustrative and not in a limiting sense.

In the illustrative embodiment, the magnet 60 is mounted to the carrier 50 which defines the pivot axle for the pedal. Thus, the magnet 60 is operatively connected to the pedal to rotate about the axis defined by the carrier 50 as the pedal is depressed. It could also be possible to mount the magnet 60 to the side of the pedal assembly head 26 proximate the Hall effect chip 74. This would achieve the same desired result—elimination of moving parts in the sensor cavity to thereby allow for sealing of the sensor cavity, preferably with an encapsulating sealant.

The snap connection of the magnet carrier 50 to the pedal assembly head 26 could be accomplished in other ways. Although the projection/nub 56 is formed on the carrier 50 to be received in a recess in the wall of the head passage 28, the projection could be formed on the head passage wall and the shaft could be provided with a depression or opening in the arm 58 which then engages the projection. In other possible embodiments, the individual depressions 30 of the head passage could be replaced with a circumferential groove (which could alternatively be formed on the outer surface of the shaft 38). The projections 38 could remain as individual projections, or they could be formed by a circumferential ring. Although the head passage 30 and the carrier 50 are both shown as being generally elongated circles, the passage 30 and a carrier body 54 could be polygonal. These matching polygonal shapes of the head passage and the carrier body would further help rotationally fix the carrier and pedal head together. In this instance, the projection (or depression/groove) would be formed along the polygonal portion of the carrier. Additionally, the carrier and pedal head can be rotationally fixed together by means of axially extending splines which are received in axially extending grooves. The spline could be formed on either the outer surface of the shaft or the wall of the head passage 30, and the splines would be formed on the other of the two. In a further alternative, the carrier could define a passage which extends through the carrier generally normal to the axis of the shaft, and the pedal assembly arm 24 could be inserted into this channel to rotationally fix the pedal assembly 20 and carrier 50 together. These examples are merely illustrative.

The invention claimed is:

1. A throttle pedal assembly comprising:
a unitary, one-piece housing having a first side wall, a second side wall, a top wall, a bottom wall, a front wall and a back wall which, in combination, define a main chamber and a sensor cavity adjacent said main chamber; said sensor cavity being separated from said main chamber by a common wall which isolates said sensor cavity from said main chamber; the main chamber being open to the front and bottom of the housing and being defined in part by the first side wall and common wall which are opposite each other; and the sensor cavity being open to the top wall and being defined in part by the second side wall and the common wall; said main chamber comprising a through hole in said side first wall and a blind bore in said common wall which is co-axial with said opening in said first wall;
a pedal assembly comprising a pedal, a pedal arm, and a head at an end of the pedal arm, the head being sized to be inserted into the housing main chamber; said head defining a passage which extends through said pedal head;
a pedal shaft, separate from said pedal assembly, sized to extend though said opening in said first wall of said housing, through said head passage, and to be received in said blind bore of said common wall; whereby said pedal shaft mounts said pedal assembly in said main chamber for pivotal motion of said pedal assembly relative to said main chamber about a pivot axis defined by said pedal shaft; said pedal shaft and said pedal assembly head being configured to be snappingly connected together; whereby said pedal assembly is being rotationally fixed relative to said pedal head and whereby said pedal assembly is mounted in said housing without the use of tools;
a magnet positioned on said pedal shaft such that when said pedal shaft is mounted in said housing, said magnet will be in said blind bore; said magnet being coaxial with said pivot axis such that said magnet rotates on said pivot axis as said pedal assembly rotates about said pivot axis;

a Hall effect sensor assembly mounted in the sensor cavity; the Hall effect sensor having a Hall chip; the cavity and Hall effect sensor assembly being respectively shaped, sized, and positioned in said sensor cavity such that the Hall chip is aligned with said pivot axis such that the Hall chip and the magnet lay on a common axis, and whereby the magnet rotates about the pivot axis relative to; and a seal which closes the sensor cavity to prevent contaminants from entering the cavity.

2. The throttle pedal assembly of claim 1 wherein one of a depression and a projection are formed on a surface of said passage of said pedal assembly arm and the other of said depression and projection are formed on an outer surface of said axle.

3. The throttle pedal assembly of claim 2 wherein said projection comprises at least one nub extending from one of said surface of said passage and said axle.

4. The throttle pedal assembly of claim 2 wherein said depression is defined by an opening extending from an edge of said end of said arm and through said passage of said arm.

5. The throttle pedal assembly of claim 1 wherein said seal is defined by a resin sealant which encapsulates the sensor assembly and substantially fills the sensor cavity.

6. The throttle pedal assembly of claim 1 wherein said magnet is mounted on a pivot axle; said pivot axle being rotationally fixed relative to said pedal assembly.

7. The pedal assembly of claim 1 wherein the magnet comprises a single magnet.

8. The throttle pedal assembly of claim 1 wherein the pedal shaft and the passage through the pedal head are shaped complimentarily to each other, and wherein the shape of the pedal shaft and the passage prevents rotation of the shaft within the passage.

* * * * *